United States Patent [19]
Hostetler

[11] 3,893,423
[45] July 8, 1975

[54] RECIRCULATING FEEDER
[75] Inventor: Eldon S. Hostetler, Middlebury, Ind.
[73] Assignee: Chore-Time Equipment, Inc., Milford, Ind.
[22] Filed: Jan. 14, 1974
[21] Appl. No.: 433,147

[52] U.S. Cl. ............................................ 119/52 AF
[51] Int. Cl. ................................................ A01k 5/02
[58] Field of Search .......... 119/52 AF, 52 R, 53, 18

[56] References Cited
UNITED STATES PATENTS

| | | | |
|---|---|---|---|
| 2,522,449 | 9/1950 | Inman | 119/52 AF |
| 2,563,321 | 8/1951 | Dugan | 119/52 AF |
| 2,693,169 | 11/1954 | Otis | 119/52 AF X |
| 3,075,495 | 1/1963 | Stoterau et al. | 119/18 X |
| 3,230,933 | 1/1966 | Myers et al. | 119/53 |

Primary Examiner—Hugh R. Chamblee
Attorney, Agent, or Firm—Olson, Trexler, Wolters, Bushnell & Fosse, Ltd.

[57] ABSTRACT

A low cost feed recirculating system is disclosed for use with poultry and the like. Feed mix is delivered from a remote source to a receiver surge bin. After passing through a control gate, the feed passes from the intake end of an upper auger conveyor past poultry-containing cages to a downstream discharge end. Unconsumed feed is delivered by a drop tube to a lower auger conveyor for movement past a lower tier of cages. Feed reaching the discharge end of the lower conveyor is redelivered to the receiver surge bin. A closed loop feed flow path is thus established, and the feed circulates and recirculates around the flow path until it is consumed.

18 Claims, 8 Drawing Figures

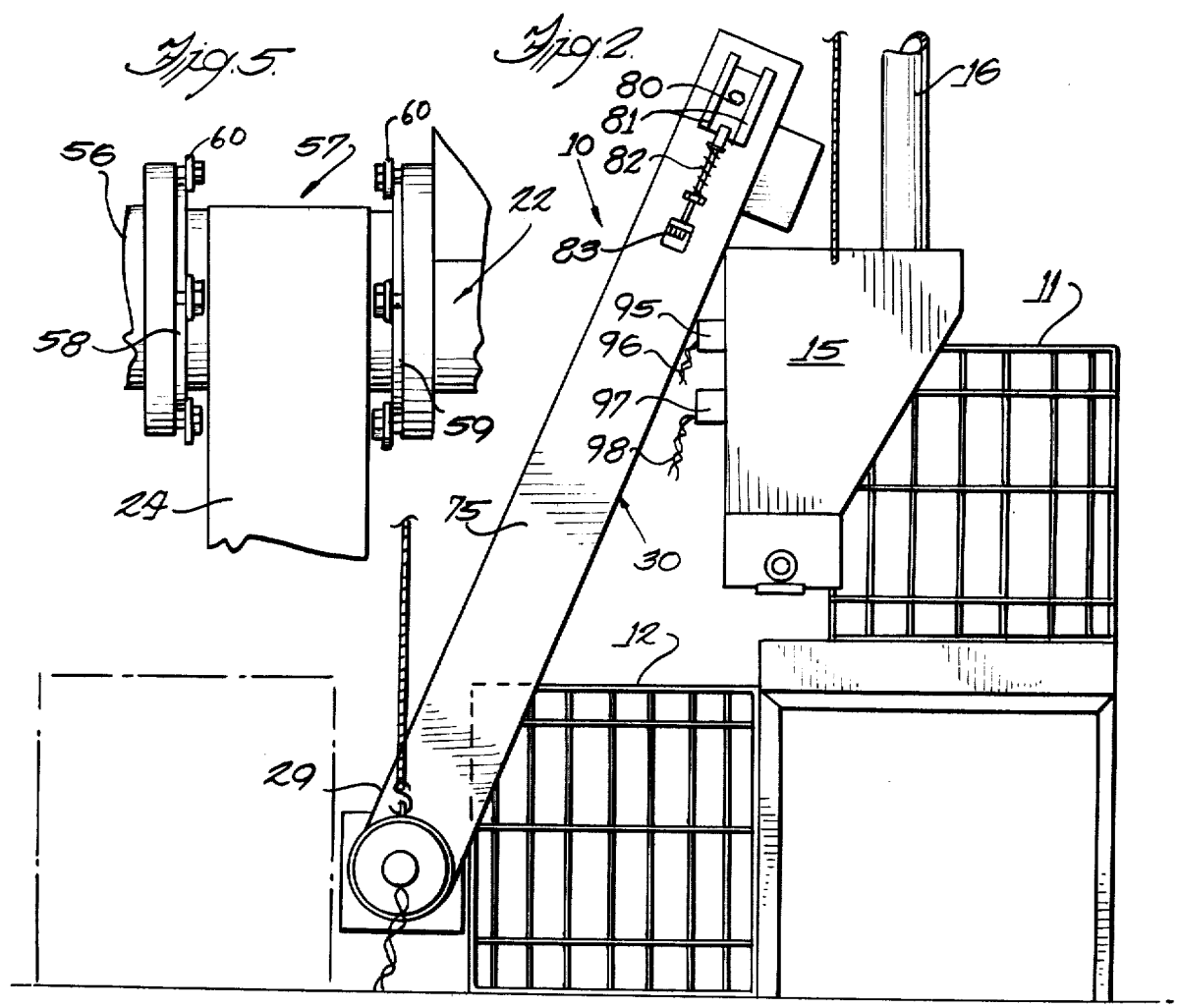
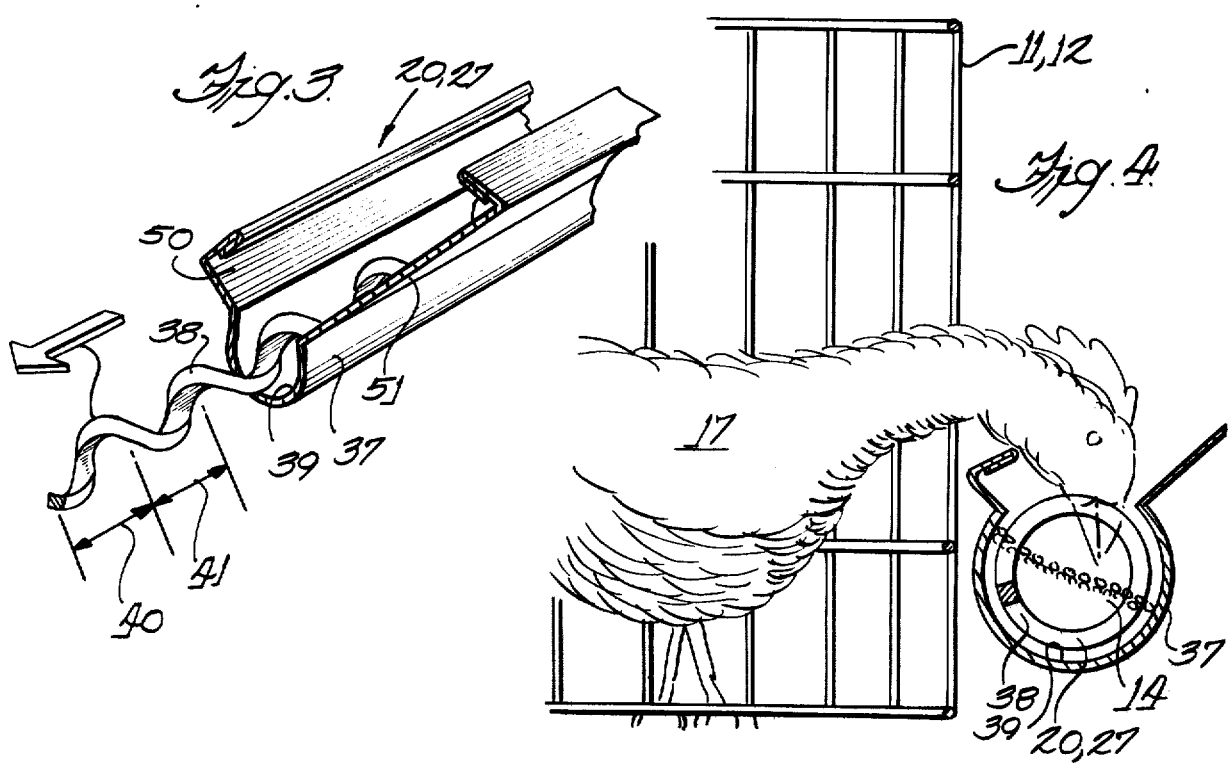

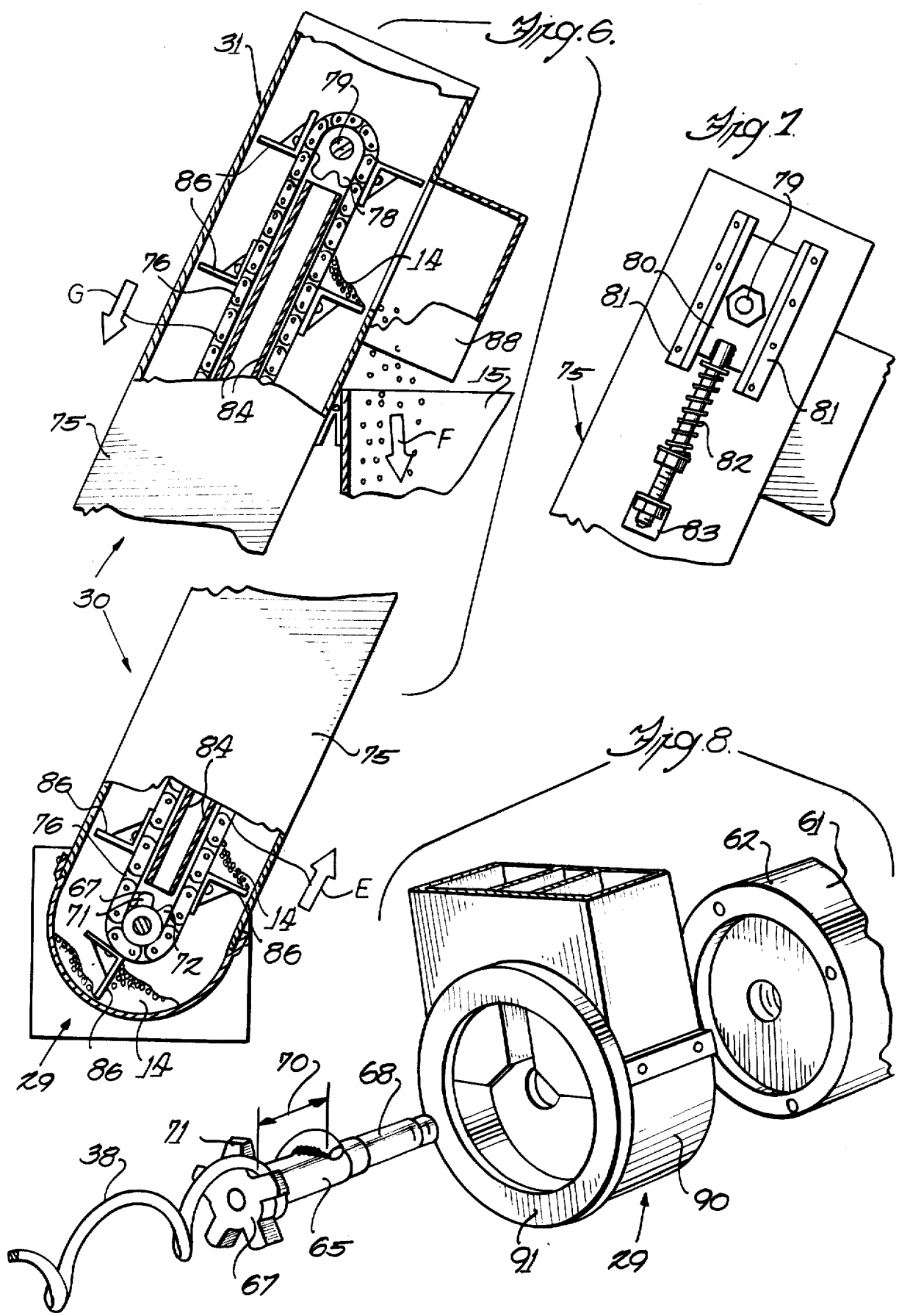

RECIRCULATING FEEDER

BACKGROUND OF THE INVENTION

This invention relates generally to feeding systems for poultry and the like, and more particularly concerns feeding systems for continuously circulating feed particles comprising a feed mix past poultry or like consuming animals which may be located in relatively small cages or other restricted areas.

Modern laying hen husbandry operations raise relatively large flocks of birds and maintain them with relatively small amounts of labor to minimize costs and maximize production of eggs. In some advanced systems, a relatively large number of cages are arrayed within a poultry house, and each cage contains about four or five adult birds. Feeding caged fowl requires that the necessary feed mix be delivered to convenient access points adjacent each cage. When the caged flock is properly maintained, and when it is fed an appropriately constituted feed mix, the laying hens convert maximum amounts of feed into end egg production; relatively large numbers of full sized, commercially valuable eggs can be recovered from predesignated points within the poultry house. By carefully selecting the feed mix constituents and by carefully controlling the delivery of the feed mix to the poultry, egg production costs can be considerably reduced. Further cost minimization can be accomplished, of course, by minimizing the initial cost of the poultry feeding apparatus or system.

In using automated feeding systems, it can be important to avoid the stagnant collection of feed mix particles at any point within the system. Such collection may permit the feed mix component particles to separate, thereby delivering an unbalanced diet downstream to the consuming poultry. Elimination of collecting points within the feeding system encourages the complete intermingling of feed mix particles of differing sizes, shapes, weights and coadhesive qualities. Delivery of a full proportion of the feed mix to all the feed access locations is important if the receiving poultry are to consume a balanced diet of feed, as the system operator has intended. Moreover, some feed particles, when collected and permitted to stand over a period of time, tend to putrefy and spoil adjacent feed.

Another design consideration is the tendency of poultry to learn to pick over the feed mix presented to them, choosing the choicest morsels for first consumption and leaving the remaining feed mix constituents for later consumption or for consumption by other birds. Conversely, if fresh, well mixed feed is presented to the poultry and then quickly removed from their feeding reach, the poultry encounter a much more difficult task in picking over the feed, and consequently tend to consume a more evenly balanced diet. Further, if unconsumed feed mix particles are continuously re-presented to the poultry, they will eventually be consumed, and the feed mix in the feeding system will stay relatively fresh. This re-presentation of unconsumed feed can be accomplished with a feed system which re-circulates feed particles past feeding poultry on a repeating basis until the particles are eventually eaten.

It is therefore the general object of this invention to provide a low cost, positive flow recirculating conveyor system for feeding poultry and the like which is especially suitable for use with caged or otherwise restricted poultry.

A more specific object is to provide a low cost recirculating conveyor system wherein numerous consecutively arrayed pockets of feed are presented to the caged birds for consumption. It is a related object to provide a conveyor feeding system utilizing auger conveyors which delivers feed to caged birds and which recirculates and re-presents unconsumed feed particles to the birds until consumption finally occurs.

Another object of the invention is to provide a feed conveyor and presentation system which eliminates stagnant feed collecting points. A related object is to provide a feed conveyor and presentation system which minimizes feed wastage and spoilage.

Yet another object of the invention is to provide a commercially attractive feed conveyor system having several conveyors driven from a common power source, thereby minimizing system cost and power consumption.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 2 is an end elevational view of the feed recirculating system and the poultry cages illustrated in FIG. 1;

FIG. 3 is a fragmentary perspective view showing in further detail a typical auger conveyor;

FIG. 4 is an elevational view showing a typical cage, a feed-consuming bird, and the auger conveyor;

FIG. 5 is an elevational view of the mechanism by which the discharge end of an auger conveyor is functionally connected to a drop tube conveyor;

FIG. 6 is a fragmentary elevational view of an endless belt conveyor, broken away to show interior conveyor parts;

FIG. 7 is a fragmentary elevational view similar to FIG. 5 showing the endless conveyor belt tensioning mechanism; and FIG. 8 is an exploded fragmentary perspective view showing in further detail associated parts of the auger and endless belt conveyors, and the common power source used to drive the conveyors.

DETAILED DESCRIPTION

Figure 1:
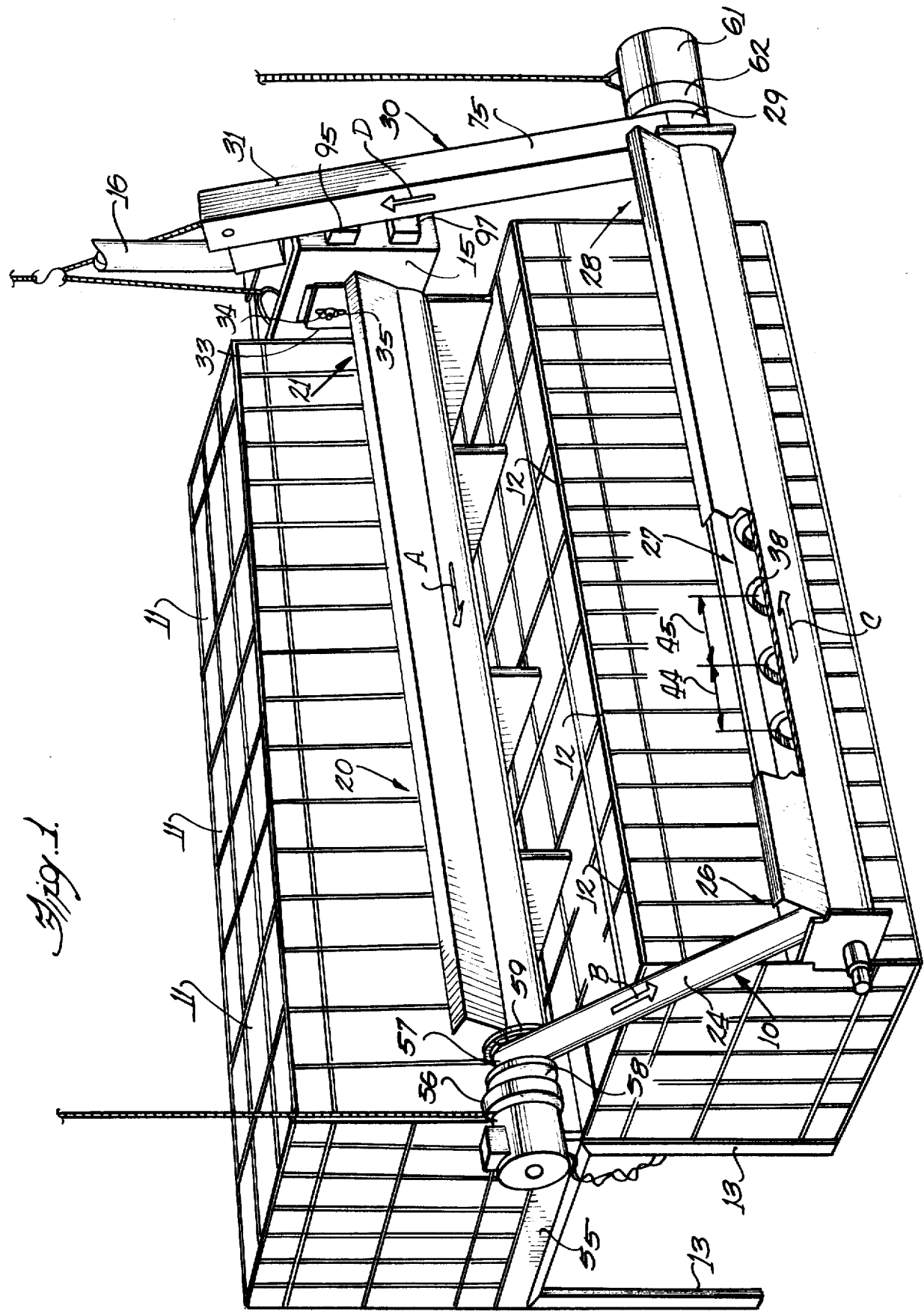
FIG. 1 is a general perspective view showing an embodiment of the novel feed conveyor recirculating system and associate poultry cages.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention.

Turning first to FIG. 1, there is shown generally the novel poultry feed recirculating system 10 as it appears when installed in a poultry house or other husbandry location adjacent a number of poultry-containing cages 11 and 12 which are supported by convenient structures such as legs 13. Feed 14 (see FIG. 4) is transported to the recirculating system 10 from a remote supply (not shown) and is delivered to a surge bin receiver 15 through a drop tube 16 or other convenient means. To eliminate stagnation anywhere within the overall system, this feed transport system can be of a recirculating variety. One such recirculating transport system is described in U.S. Pat. No. 25,589 to Hostetler et al. Feed can be delivered to the surge bin receiver 15 during pre-set time intervals as explained in U.S. Pat. No. 3,611,995 to Murto. Moreover, the amount of feed delivered to the surge bin 15 can be predetermined and measured by weight, as more fully described in copending Hostetler U.S. application Ser. No. 283,724, filed Aug. 25, 1972.

Since movement of the poultry 17 is restricted, feed 14 must be made available to the poultry 17 at points at least adjacent each poultry-containing cage 11 and 12. In accordance with the invention, therefore, the recirculating poultry feeding conveyor system 10 includes an upper open-topped conveyor 20 located adjacent the poultry cages 11 so as to present feed to the poultry caged therein for a consumption. As illustrated particularly in FIG. 1, feed can be considered to move in a general path from the drop tube 16 and receiver surge bin 15 to a first conveyor intake end 21, and then in the direction of the arrow A to a conveyor discharge end 22. On reaching the discharge end 22, feed is delivered to a drop tube conveyor 24, down which it tumbles in the general direction of the arrow B. Feed is thus directed to the intake end 26 of a lower conveyor 27, and it then moves in the general direction of the arrow C along the lower conveyor 27 to a discharge end 28. Operatively connected to the discharge end 28 of the auger conveyor 27 is the intake end 29 of an endless belt conveyor 30. Feed carried into the endless belt conveyor 30 is raised in the direction indicated by the arrow D to a discharge end 31, where the feed is discharged and returned to the receiver surge bin 15.

There is thus established a closed loop feed flow path around which the feed 14 circulates and recirculates. As the feed moves down the auger conveyors 20 and 27, the feed is presented and re-presented to the adjacent consuming poultry until it is eaten. Together, the drop tube 24, the conveyor 27 and the endless belt conveyor 30 can be considered to comprise feed return transport means which move unconsumed feed from the discharge end 22 of the first conveyor 20 back to the intake end 21. It is also to be noted that the endless belt conveyor 30 is functionally interposed between the second auger conveyor 27 and the first auger conveyor 20. The drop tube 24 provides a relatively inexpensive feed transport device which can be used to move feed from a relatively high-level conveyor 20 to a lower-level conveyor 27.

A flow-control gate 33 is mounted at the outflow of the surge bin receiver 15. The gate 33 is provided with an adjustment such as a wing nut 34 and bolt operatively connected through an elongated gate slot 35 to permit the gate 33 to be raised and lowered, thereby adjusting the maximum level of feed flowing from the surge bin receiver 15 into the first conveyor 20.

As illustrated in FIGS. 1, 3 and 4, the auger conveyors 20 and 27 each include hollow trough-like housings 37, and auger members 38 are mounted therein for rotation on the trough bottom 39. The illustrated auger members 38 are centerless, and include a plurality of flights 40 and 41 adapted to conform to the shape of the conveyor trough bottom 39. When these augers 38 are rotated, they pull feed along the conveyors 20 and 27 from the respective conveyor intake ends 21 and 26 to the discharge ends 22 and 28 in the direction of the arrows A and C. The flights 40 and 41 provide individualized, moving, feed-containing pockets 44 and 45 from which the poultry 17 can obtain the feed 14 for consumption. Inclined flanges 50 and 51 can be provided on the conveyor housing 37 to catch feed 14 dribbled or tossed about by the poultry 17; the caught feed is redirected toward the bottom 39 of the auger conveyors 20 and 27.

To drive the auger member 38 carried within the first auger conveyor 20, a motor 55 is mounted at the discharge end 22. This motor 55 is connected, by a speed-reducing gearbox 56 and an interconnecting shaft (not shown) to the auger member 38. The motor 55 can be energized by an appropriate signal from a time clock, a feed level sensor, or from some other convenient source.

It will be noted from FIG. 5 that a header box 57 of the drop tube 24 is connected to the motor gearbox 56 and the conveyor discharge end 22 by annular flanges 58 and 59. A plurality of bolts are secured adjacent these interconnecting flanges on the gearbox 56 and conveyor end 22, and the bolts are provided with extended-diameter heads or washers 60. When the bolts are tightened, the flanges are drawn toward the gearbox 56 and conveyor end 22, thereby providing a feed-tight joint which permits the drop tube 24 to be attached to the discharge end 22 of the conveyor 20 at any radial of angular position desired.

It is a feature of the invention that the auger 38 used with the lower conveyor 27 and the endless belt conveyor 30 are driven from a common power source such as a motor 61 operating through a speed-reducing gearbox 62. As best illustrated in FIG. 7, a common interconnector shaft 65 engages and is rigidly connected to both the auger member 38 and an endless belt conveyor drive pulley 67 located at the intake end 29 of the belt conveyor 30. An input end 58 of the shaft 65 is adapted for connection to gears (not shown) carried within the gearbox 62. Thus, the auger member 38, the drive pulleys 67 of the endless belt conveyor 30, and the shaft 65 are all rotated by the common power source motor 61 at a common speed, and a smooth uninterrupted flow of feed from the auger conveyor 27 to the endless belt conveyor 30 is encouraged. To insure rigid attachment of the auger 38 to the interconnector common shaft 65, at least one auger flight 70 passes between adjacent teeth 71 and 72 on the endless belt drive pulley or sprocket wheel 67. This auger flight 70 is secured to the sprocket drive pulley 67 and through the shaft 65 by weldments, a clamping block, or other convenient means. The drive pulley sprocket wheel 67 is rigidly secured to the shaft 65 by a key or other convenient arrangement.

The endless belt conveyor 30 rapidly and efficiently transports unconsumed feed reaching the discharge end 28 of the lower line conveyor 27 back to the surge bin received 15 for subsequent recirculatory delivery to the intake end 21 of the first line conveyor 20. This feed transportation is effected at relatively high speed with relatively low power demand. To this end, the endless belt conveyor 30 includes, as illustrated in FIGS. 2 and 6–8, an elongated, hollow, enclosed housing 75 and an endless belt conveyor 76 mounted for cyclic motion within the housing 75. In the illustrated embodiment, this belt member 76 takes the form of a roller link chain, adapted for engagement by the teeth 71 and 72 of the drive sprocket wheel 67, but it will be understood that the belt member 76 can be fabricated of other suitable belting mechanism or material.

At the discharge end 31 of the endless belt conveyor 30, an idler pulley 78 engages the belt member 76. To maintain appropriate tension upon the belt member 76, the idler pulley 78 is provided with a shaft 79 which is journaled, as shown in FIG. 2, upon a bearing 80 mounted for sliding motion between guides 81 fixed upon the housing 75 of the conveyor 30. A biasing device, such as compressed coil spring 82 mounted at one end to a fixed bracket 83, urges the bearing 80 and the idler pulley 78 in a direction away from the drive pulley 67, thereby maintaining a pre-set tension upon the endless belt member 76. A spacer member 84 divides the housing interior and provides additional guiding action to the motion of the endless belt 76.

To engage and transport feed from the intake end 29 to the discharge end 31 of the conveyor, a number of individual feed-carrying scoop members 86 are mounted upon the belt 76 for motion therewith. As illustrated in FIG. 5, feed is engaged by the scoops 86 at the intake end 29 of the conveyor. As the belt is cycled as indicated by the arrows E and F, the feed moves generally upwardly, and is discharged through a spout 88 at the discharge end 31 of the conveyor 30, whereupon it falls in the direction of the arrow G downwardly into the receiving surge bin 15.

The feed intake end 29 of the endless belt conveyor 30 includes a hollow, U-shaped intake member 90 as shown in FIG. 7 and elsewhere. Congruently and communicatively interconnecting openings in the discharge end 28 of the lower auger conveyor 27 and the intake end 29 of the endless belt conveyor 30 permit direct passage of feed from the auger conveyor 27 to the endless belt conveyor 31.

Using structure similar to that which interconnects the upper auger conveyor 20 and the drop tube 24, a suitably feed-tight joint is provided between the auger conveyor 27 and the endless belt conveyor 30. Here, an annular flange 91 is secured to the auger conveyor discharge end 28 as by washer and bolt devices or other convenient clamping mechanisms.

It is another feature of the invention that excessive accumulation of feed within the receiving surge bin 15 or, conversely, depletion of feed from the surge bin 15 to an excessively low level can be sensed and other portions of the feed system can be adjusted in their operation to overcome such feed level condition. For example, if an excessively high level of feed is sensed within the receiver 15, feed delivery from the remote supply (not shown) through the drop tube 16 can be halted. To this end, a first sensor 95 can be located within or upon the receiving surge bin 15 as shown in FIG. 1 and 2 to sense the presence or absence of feed at a maximum feed level. Interconnector means such as wires 96 and other appropriate circuitry (not shown) interconnect the first sensor 95 and the other feeding system power devices for stopping the operation of the conveyors in response to the sensed presence or absence of feed at this maximum feed level within the surge bin receiver 15. Similarly, a second sensor 97 can be located to sense a minimum feed level within the surge bin receiver 15. Second interconnector means such as wires 98 and other circuitry (not shown) can be used, similarly, to cause the conveyor drive devices to start or stop operation of feed system parts and feed delivery in response to the sensed presence or absence of feed at this minimum level. This sensing system, and appropriate adjustment of the feed level gate 33 as described above, permit a preselected, uniform quantity of feed to be carried within the feed line conveyors 20 and 27. This preselected uniform quantity of feed encourages uniform, predictable feed consumption by the feeding foul.

The invention is claimed as follows:

1. A conveyor system for feeding poultry and the like, comprising an interconnected belt conveyor and auger conveyor, the belt conveyor including a housing having intake and discharge ends, an endless belt member mounted for cyclic motion between said ends and adapted to engage feed deposited at the intake end and transport the feed to the discharge end, and belt conveyor belt drive means mounted adjacent one opening for driving the belt in its cyclic motion, the auger conveyor including an auger member having a plurality of spiral flights for urging feed along the auger conveyor from an intake end to a discharge end and extending into the belt conveyor housing, and auger conveyor drive means for rotating the auger within the auger conveyor, and interconnector means including a shaft engaging both the auger conveyor auger and the belt conveyor belt drive means for common rotation and common operation from a single power source.

2. A conveyor system according to claim 1 including feed return transport means for transporting unconsumed feed from the discharge end of one of said conveyors to the intake end of the other of said conveyors, thereby establishing a closed loop feed flow path around which feed circulates and recirculates until the feed is consumed.

3. A conveyor system according to claim 2 wherein said feed return transport means includes a second open-topped auger conveyor having intake and discharge auger ends and located adjacent poultry cages to present feed to caged poultry for consumption, the intake end of said second auger conveyor being located adjacent the discharge end of another of said conveyors to receive a flow of feed threrefrom, and means for directing feed from said second auger conveyor discharge end to said first auger conveyor intake end.

4. A conveyor system according to claim 3 wherein said second open-topped conveyor intake end is located adjacent the discharge end of said endless belt conveyor, the endless belt conveyor being functionally interposed between said first and second auger conveyors.

5. A conveyor system according to claim 4 wherein said first and second auger conveyors are mounted at differing elevations and wherein said feed return transport means includes drop tube means for transporting feed from the discharge end of the higher elevation auger conveyor to the intake end of the lower elevation auger conveyor.

6. A conveyor system according to claim 2 including feed input means for delivering new feed from a remote source to said conveyors and said closed loop feed flow path.

7. A conveyor system according to claim 2 including first sensor means for sensing the presence or absence of feed at a maximum feed level at a predesignated spot within said feed flow path, and first interconnector means interconnecting said first sensor means and said common conveyor drive means for starting or stopping the operation of said conveyors in response to the sensed presence or absence of feed at said predesignated spot.

8. A conveyor system according to claim 2 including second sensor means for sensing the presence or absence of feed at a minimum feed level at a predesignated spot within said feed flow path and second interconnector means interconnecting said second sensor means and said common conveyor drive means for starting or stopping the operation of said conveyors in response to the sensed presence or absence of feed at said predesignated spot.

9. A conveyor system according to claim 2 including receiver surge bin means functionally interposed in said closed loop feed flow path and adopted to receive new feed from a remote source and introduce said feed to said closed loop feed flow path.

10. A conveyor system according to claim 9 including first and second sensor means for sensing the presence or absence of feed at respective maximum and minimum levels within said receiver surge bin means and for starting or stopping the operation of said conveyors in response to said presence or absence of feed at said maximum and minimum levels.

11. A conveyor system for feeding poultry and the like, comprising an interconnected belt conveyor and auger conveyor, the belt conveyor including a hollow housing having intake and discharge openings therein, an endless belt conveyor member mounted within the housing for cyclic motion between said openings, a plurality of scoop members mounted on the belt conveyor member and adapted to engage feed deposited within the housing at the intake opening and transport the feed to the discharge opening and belt conveyor drive pulley means mounted adjacent one opening for driving the belt in its cyclic motion, the auger conveyor including a hollow housing having intake and discharge openings therein and an auger member mounted within the housing and having a plurality of spiral flights adapted to conform to the shape of at least a portion of the housing interior surface for urging feed along the housing from the intake end to the discharge end as the auger is rotated, aguer conveyor drive means for rotating the auger within the auger conveyor housing, and interconnector means including a shaft engaging the auger conveyor auger and belt conveyor drive pulley for common rotation, and common operation from a single power source.

12. A conveyor system according to claim 12 including direct connection means rigidly attaching the auger to the shaft, and direct connection means rigidly attaching the pulley to the shaft, the aguer, the pulley and the shaft being rotated by the power source at a common speed.

13. A conveyor system according to claim 11 wherein said belt conveyor belt member includes an endless linked chain, and said drive pulley means include a toothed sprocket wheel adapted to engage the chain links and drive the belt, and wherein at least one end of the auger conveyor auger member is centerless, at least one centerless auger flight passing between the sprocket wheel teeth for rigid attachment to the sprocket wheel, thereby permitting the belt conveyor belt member and the auger conveyor auger member to be driven together at a common speed by the sprocket wheel.

14. A conveyor system according to claim 11 including intercommunication means operatively interconnecting one of the belt conveyor housing openings with the opposite auger conveyor housing openings to permit the delivery of feed from one conveyor to the other.

15. A conveyor system according to claim 11 wherein the auger conveyor housing discharge opening is located congruently and communicatively with the housing conveyor intake opening to permit the direct passage of feed from the aguer conveyor to the belt conveyor.

16. A conveyor system according to claim 11 including means for halting operation of said conveyors in response to a sensed excessively high feed level at a predetermined point in the system.

17. A conveyor system according to claim 11 including means for halting operation of said conveyors in response to a sensed excessively low feed level at a predetermined point in the system.

18. a conveyor system according to claim 11 including receiver surge bin means to receive a first flow of feed from a remote source and a second flow of feed from a conveyor discharge means, and including first sensing means for halting one flow of feed in response to a sensed excessively high feed level in the holding bin, and second sensing means inducing at least one flow of feed in response to a sensed excessively low feed level in the holding bin.

* * * * *

UNITED STATES PATENT OFFICE
CERTIFICATE OF CORRECTION

Patent No. 3,893,423      Dated JULY 8, 1975

Inventor(s) ELDON S. HOSTETLER

It is certified that error appears in the above-identified patent and that said Letters Patent are hereby corrected as shown below:

Col. 3, line 2, "U.S. Patent No. 25,589" should be --U.S. Re. No. 25,580--.

Col. 4, line 28, "of" should be --or--

Col. 4, line 57, "received" should be --receiver--

Col. 7, line 42, "aguer" should be --auger--

Col. 8, line 1, "claim 12" should be --claim 11--

Col. 8, line 4, "aguer" should be --auger--

Col. 8, line 28, "aguer" should be --auger--

Signed and Sealed this second Day of December 1975

[SEAL]

Attest:

RUTH C. MASON  
Attesting Officer

C. MARSHALL DANN  
Commissioner of Patents and Trademarks